United States Patent [19]

Bellingham

[11] 3,982,028
[45] Sept. 21, 1976

[54] PRESERVATIVES FOR FORAGE, HAY, GRAIN AND ANIMAL FEEDS
[75] Inventor: Francis Bellingham, Stockton-on-Tees, England
[73] Assignee: Imperial Chemical Industries Limited, London, England
[22] Filed: Sept. 13, 1973
[21] Appl. No.: 396,666

[30] Foreign Application Priority Data
Sept. 14, 1972 United Kingdom............... 42690/72

[52] U.S. Cl. .................................. 426/69; 424/317; 426/807; 426/335; 426/532; 426/636; 426/635
[51] Int. Cl.² .......................................... A23K 1/00
[58] Field of Search .......... 426/151, 227, 310, 221, 426/331, 335, 210, 69, 807, 635, 636, 532; 424/317; 252/407; 260/526

[56] References Cited
UNITED STATES PATENTS
3,642,488   2/1972   Watchorn ............................ 426/69
3,806,600   4/1974   Lapore ............................... 424/317

FOREIGN PATENTS OR APPLICATIONS
1,276,677   6/1972   United Kingdom ...................... 99/8

OTHER PUBLICATIONS
Condensed Chemical Dictionary – Hawley, 8th Ed., Van Nostrand, May 1971, p. 481.
Technical News Letter, Ministry of Agriculture, 11/68, 10/4/68.
H. D. Young, Chem. Abs., v. 24, 1930, p. 3595.

Primary Examiner—Norman Yudkoff
Assistant Examiner—Hiram H. Bernstein
Attorney, Agent, or Firm—Cushman, Darby & Cushman

[57] ABSTRACT
Feedstuffs and silage for ruminants contain mixtures of isobutyraldehyde (IBD) with mineral or fatty acids, formalin, trioxane, or urea plus chlorine, derivatives of IBD selected from isobutanol (alone or in admixture with isobutyric acid or salts thereof), isobutyl halides or esters of fatty acids, isobutyrates, di-isobutyrates, and chlorinated isobutylidene diurea.

7 Claims, No Drawings

PRESERVATIVES FOR FORAGE, HAY, GRAIN AND ANIMAL FEEDS

The present invention relates to substances suitable for feeding to animals (particularly to ruminants) in admixture with other feedstuffs, for example in compound feeds, feed blocks, liquid feed supplements, drenches, slow-release pellets, or the like. The substances may each fulfil one or more useful functions; for example, they may act as methane inhibitors, they may control rumen fermentation (which, in turn, leads to enhanced animal performance), they may act as sources of energy, they may act as preservatives for animal feedstuffs (e.g. compound feedstuffs containing molasses, and ensiled products such as green fodder, hay, grain).

In our co-pending British patent application No: 31045/72 filed July 3, 1972, (corresponding to U.S. application Ser. No: 373,783) we have described the use of isobutyric acid (IBA) or salts or esters thereof, either alone or in admixture with other substances, e.g. formalin and/or sulphuric acid, as preservatives for stored products, such as compound animal feeds containing molasses, green fodder, hay, grain.

Encouraged by these results, we examined isobutyraldehyde (IBD), which is a very cheap material, to see whether it, or easily-prepared derivatives thereof, either alone or in combination with each other or with other compounds, would be useful as a preservative, as a methane-inhibitor, as an agent for controlling (reducing or stimulating) rumen fermentation, and/or as a source of energy. It was hoped that at least one such compound or mixture would be useful for at least one such purpose, and this proved to be the case.

The present invention accordingly provides animal feedstuffs, in particular compound feeds, feedblocks, liquid feed supplements, drenches, slow release pellets and ensiled green fodder, hay and grain, containing mixtures of isobutyraldehyde with other substances, derivatives of isobutyraldehyde and mixtures of said derivatives with each other or with other substances.

In general moulds and yeasts are the main organisms responsible for the deterioration of stored products such as forage, hay, grain and compound animal feeds. Thus in a screen for possible chemical additives, preliminary experiments were carried out to determine the antifungal and preservative properties of several simple mixture and compounds derived from IBD.

These preliminary in vitro experiments indicated that certain of these compounds, alone or in mixtures inhibited the development of microbial growth and permitted satisfactory storage of forage, hay, grain, compound animal feeds, etc. at high moisture contents (e.g. up to 50%).

The additives listed in Table 1 hereunder showed preservative properties when incorporated into compound animal feeds using molasses as carrier for the additive (see Table 2 for composition of feed).

Table 1

| | Additive | Treatment level % w/w |
|---|---|---|
| 1 | IBD/Sulphuric acid (40% w/w) mixtures, e.g. 3 vol acid: 1 vol IBD | 2 |
| 2 | IBD/AGS* (1.1) w/w | 5 |
| 3 | IBD/formalin (3:1 v/v) | 2 |

Table 1-continued

Additives which showed preservative properties in compound animal feeds

| | Additive | Treatment level % w/w |
|---|---|---|
| 4 | IBD/isobutyric acid mixtures (e.g. 3:1 to 1:3) v/v | 2 |
| 5 | IBD/acetic acid (conc.) mixtures (eg. 3:1 v/v) | 2 |
| 6 | Isobutanol | 2 |

*AGS - a mixture of adipic, glutaric and succinic acids, a by-product in the manufacture of nylon.

Table 2

| Compound animal feed composition | |
|---|---|
| Barley | 2000g |
| Wheat | 1500g |
| Wheat-feed | 480g |
| Groundnut | 308g |
| Molasses | 337g |
| Salt | 40g |
| Limestone | 18g |
| Dicalcium phosphate | 70g |
| Barley - vitamin premix | 250g |
| | 5000g |

Additives were incorporated into the above composition, using molasses as carrier, and the treated concentrate was incubated at 25°C under conditions where temperature changes could be accurately monitored. In this way, microbial activity was detected by observations of rapid temperature rises during the first six weeks of storage. In addition, chemical and microbiological analyses were carried out to assess the extent of deterioration which might have occured during storage.

Table 3

Temperature response of compound animal feeds treated with additives and incubated at 25°C

| Day | Control (no additive) Temp.°C | IBD:AGS(1:1) 5% Temp.°C | IBD:i-butyric acid(1:1) 2% Temp.°C |
|---|---|---|---|
| 7 | 27 | 24 | 24 |
| 14 | 29.5 | 26 | 25 |
| 21 | 29 | 25 | 24 |
| 28 | 28.5 | 25 | 24.5 |
| 35 | 27 | 25.5 | 24.5 |
| 42 | 25.5 | 25 | 24 |

The compound feed of Table 2 was tested, containing various potential preservatives incorporated using molasses as carrier. This material was moistened to achieve a very high water content (≈50%) and then stored in lagged glass jars fitted with thermometers to monitor self-heating, and incubated at 25°C for 6 weeks. At the start and end of the experiment the material was assayed for various constituents including dry matter (dm), ash, oil, energy, fibre, reducing sugar and nitrogen and checked visually for mould growth.

The results obtained are summarised in Table 4. The material treated was of a very high moisture content (about 50% m.c.) and stored at a relatively high temperature, optimal for the growth of many typical storage moulds (i.e. 25°C).

Therefore it was considered that any additive which resulted in a 30% to 50% reduction in any of the parameters of Table 4 would be worthy of further consideration even if they showed signs of visible moulding, provided this was less than in the case of the control.

The treatments which emerged as of high potential on this basis are as follows:

| | |
|---|---|
| IBD/isobutyric acid | (3:1) v/v |
| IBD/isobutyric acid | (1:1) v/v |
| IBD/isobutyric acid | (1:3) v/v |
| IBD/AGS acid | (1:1) v/v |
| IBD/Acetic acid | (3:1) v/v |
| IBD/Formalin | (3:1) v/v |

Table 4

The effect of IBD and derivatives, alone and in admixture, on the storage stability of approx. 50% m.c. compound feed for six weeks.

| Treatment | Application rate % (v/w) | Self heating index | % losses during storage DM | % losses during storage Energy | Visible Moulding |
|---|---|---|---|---|---|
| Control | zero | 56 | 53 | 49 | + |
| Control | " | 46 | 71 | 72 | + |
| Control | " | 41 | 66 | 57 | + |
| IBD | 2 | 64 | 64 | 64 | + |
| | 5 | 50 | 59 | 61 | + |
| IBD/IBA (3:1) | 2 | 3 | 11 | 11 | − |
| (1:1) | 2 | 0 | 0 | 0 | − |
| (1:3) | 2 | 0 | 0 | 0 | − |
| IBD/$H_2SO_4$ (25% v/v) 3:1 | 2 | 16 | 37 | 38 | + |
| (1:1) | 2 | 24 | 37 | 36 | + |
| 1:3 | 2 | 14 | 13 | 17 | + |
| IBD/AGS (1:1) | 5 | 3 | 5 | 5 | − |
| IBD/Acetic acid (3:1) | 2 | 0 | 4 | 1 | − |
| IBD/Formalin (3:1) | 2 | 20 | 0 | 0 | − |
| Isobutanol | 2 | 28 | 65 | 54 | + |
| Isobutyl isobutyrate | 2 | 18 | 54 | 36 | + |
| Isobutanol/sodium isobutyrate | 2 | 25 | 79 | 70 | + |

+ indicates growth.
− indicates no growth
*self-heating index=the sum of the rise in temperature above ambient due to self-heating on alternate days throughout storage period.

In the manufacture of compound feeds the compound feed industry at the present time has to specify the use of ingredients having a high dry matter content, i.e. 10–14%. If this range is exceeded there are problems of storage due to the formation of fungal and bacterial species. The toxins associated with such microflora then limit intake and animal performance falls off.

In the process of compounding the feed the manufacturer adds steam to the mix prior to pelleting. This has the effect of raising the temperature of the mix and results in gelatinization of the starch, a process which results in the formation of stable pellets. If, however, the mix already contains appreciable quantities of water the opportunity to add steam is limited and pellet quality suffers. To overcome these limitations, compounders are now adding small quantities of propionic acid to the mix, via the molasses, and this allows higher levels of steam to be used. Work has been conducted to examine several of the additives mentioned hereinabove for this purpose.

Microbial spoilage of feedstuffs may occur on materials stored with moisture contents which give rise to equilibrium relative humidities of approximately 70% or greater. The highest m.c. which will permit safe storage depends upon the nature of the feedstuff, e.g. cereals 13–14%, oil seeds such as groundnuts, soya and linseed 6–8%. The oil content of a concentrate thus has a marked effect on the m.c. which can be permitted for mould free storage. Typical compound feeds using concentrates such as cereals, soya, groundnuts and added oil as tallow or vegetable oils may have lipid contents from 2–8% (w/w). Thus with respect to storage potential the incorporation of water may be limited by the proportion of oil present and is normally in the range 8–10% (w/w). It would be of considerable advantage for feed compounders if they could extend the range of permissible water contents up to about 18%. At this level spoilage through moulding would be almost inevitable. In addition the use of plastic bags for the storage of feeds would represent an economic saving over the currently used paper bags. However, even at low moisture contents it has been found that pelleted feeds "sweat" during storage and cause condensation to build up on the inner surface of the bag with resulting mould growth on the pellets.

Some of the additives mentioned hereinabove, even though they showed visible moulding in Table 4, were tested with compound feed pellets having the composition of Table 2, at a typical "farm" m.c. (approx. 12%), stored at ambient temperature in the open air in bins, in paper bags, and in plastic bags of varying thickness (150 $\mu$, 175 $\mu$ and 200 $\mu$). The pellets were examined in detail chemically and microbiologically during storage. The results are shown in Tables 5 to 8.

Table 5

Microbiology of compound pelleted feeds (12% m.c.), stored in air (open bins, plastic bags) for 3–4 weeks count/g.f.w.

| Treatment | % | Yeasts 4 moulds ×$10^2$ | Moulds ×$10^2$ | Aerobic Bacteria |
|---|---|---|---|---|
| Control | zero | 7040 | 48 | 3810 |
| Isobutyl isobutyrate | 1.0 | 51 | 11 | 88 |
| | 2.0 | 2800 | 102 | 240 |
| Isobutanol | 1.0 | 29 | 0 | 40 |
| | 2.0 | 18 | 14 | 5 |
| Isobutanol:IBA(2:1w/v) | 1.0 | 0 | 7 | 135 |
| | 2.0 | 32 | 35 | 7 |
| Isobutanol:IBA(1:3w/v) | 1.0 | 350 | 2 | 77 |

Table 6

Microbiology of compound pelleted feeds (12% m.c.) stored in open bins for 5-6 months. count/g.f.w.

| Treatment | % | Yeasts +moulds ×10² | Moulds ×10² | Aerobic Bacteria ×10² |
|---|---|---|---|---|
| Control | zero | 400 | 5 | 7500 |
| Isobutyl isobutyrate | 1.0 | 14 | 0 | 170 |
|  | 2.0 | 40 | 3 | 30 |
| Isobutanol | 1.0 | 150 | 0 | 26 |
|  | 2.0 | 6 | 2 | 19 |
| Isobutanol:IBA(2:1v/v) | 1.0 | 2 | 0 | 13 |
|  | 2.0 | 63 | 3 | 8 |
| Isobutanol:IBA(1:3v/v) | 1.0 | 9 | 1 | 23 |
|  | 2.0 | 62 | 1 | 160 |

Table 7

Mould contamination on compound feeds after 11 week storage (m.c. 12 %)

| Treatment | % | Mould count/g at 25°C Paper | Plastic 150μ | Plastic 175μ | Plastic 200μ | Mould count/g at 37°C Paper | Plastic 150μ | Plastic 175μ | Plastic 200μ |
|---|---|---|---|---|---|---|---|---|---|
| Control | zero | 40 | 30 | 2460 | 3355 | 25 | 0 | 10 | 5 |
| Isobutyl isobutyrate | 2 | 0 | 0 | 5 | 583 | 0 | 20 | 0 | 0 |
| Isobutanol | 2 | 5 | 0 | 0 | 15 | 0 | 0 | 0 | 80 |
| Isobutanol:IBA(2:1v/v) | 2 | 0 | 0 | 0 | 0 | 10 | 0 | 35 | 0 |
| Isobutanol:IBA(1:3v/v) | 2 | 0 | 0 | 5 | 0 | 0 | 5 | 0 | 0 |

Table 8

Mould contamination on compound feeds after 21 weeks storage (m.c. 12%)

| Treatment | % | Mould count/g at 25°C Paper bags | Plastic bags | Mould count/g at 37°C Paper bags | Plastic bags |
|---|---|---|---|---|---|
| Control | zero | 810 | 393 | 50 | 15 |
| Isobutyl isobutyrate | 2.0 | 503 | 220 | 10 | 0 |
| Isobutanol | 2.0 | 123 | 110 | 0 | 5 |
| Isobutanol:IBA(2:1v/v) | 2.0 | 55 | 268 | 0 | 0 |
| Isobutanol:IBA(1:3v/v) | 2.0 | 0 | 53 | 0 | 0 |

Experiments were carried out in which moist hay (50% m.c.) was stored for up to 6 weeks treated with various potential hay preservatives. The hay was examined at the termination of storage by chemical and microbiological techniques. Normally the additives were tested at four treatment rates, 0.25%, 0.5%, 0.75% and 1.0% (w/w) (equivalent to rates of ½, 1, 1½ and 2 gallons per ton) at least for the first 2 to 3 weeks and the results plotted to give the typical results in Table 9.

Table 9

Self-heating acid mould contamination of wet hay in the presence and absence of additives.

| Mixture Composition (v/v) | Additive | Treatment Rate % (v/w) | Total T°C rise A | B |
|---|---|---|---|---|
| — | Dry hay | — | 17 | 7 |
| — | Wet hay | — | 119 | 85 |
| 3 | Formalin | 0.25 | 181 | 150 |
| 1 | IBD | 0.5 | 179 | 131 |
|  |  | 0.75 | 134 | 86 |
|  |  | 1.0 | 126 | 73 |
| 3 | IBD | 0.25 | 97 | 83 |
| 1 | Isobutyric acid | 0.5 | 142 | 113 |
|  |  | 0.75 | 149 | 115 |
|  |  | 1.0 | 89 | 75 |
| 1 | IBD | 0.25 |  | 35 |
| 1 | Isobutyric acid | 0.5 |  | 34 |
|  |  | 0.75 |  | 2 |
|  |  | 1.0 |  | 6 |
| 1 | IBD | 0.25 |  | 99 |
| 3 | Isobutyric acid | 0.5 |  | 154 |
|  |  | 0.75 |  | 0 |
|  |  | 1.0 |  | 4 |

Table 9-continued

Self-heating acid mould contamination of wet hay in the presence and absence of additives.

| Mixture Composition (v/v) | Additive | Treatment Rate % (v/w) | Total T°C rise A | B |
|---|---|---|---|---|
| 1 | IBD | 0.25 |  | 44 |
| 1 | AGS | 0.5 |  | 43 |
| (w/w) |  | 0.75 |  | 44 |
|  |  | 1.0 |  | 120 |
| — | IBD | 1.0 | 173 | 117 |

The total temperature rise = the sum of (obs. T°C − 25°C) at 2 day intervals for (A) 42 days (B) 24 days Ruminants obtain energy from plant material via the fermentative activity of the ruminal microflora. Microorganisms metabolize celluloze, hemicelluloses and other carbohydrates of plant tissues to end products such as volatile fatty acids, carbon dioxide, methane and hydrogen. Volatile fatty acids are absorbed through the rumen walls and are utilized by the animal as primary energy sources. Most of the fermentation gas is lost from the rumen by eructation. It has been estimated that 5–10% of the total energy intake of ruminants is converted to methane and hence lost in this way. Thus the elimination of wasteful methane production would represent a considerable economic saving.

Methane is formed in the rumen by the reduction of the end products of carbohydrate fermentation, particularly $CO_2$, probably by a single bacterial species, *Methanobacterium ruminantium*. Thus selective inhibition of this organism would prevent methane synthesis. The substrates used in methane formation would then be available for conversion into fatty acids which would be of greater potential value to the ruminant.

The inter-relationships between rumen microorganisms represent an ecological entity and any attempt to reduce methane production must be selective and not cause too much disturbance in the rest of the rumen fermentation. However, since inhibition of methane synthesis will release hydrogen which might be used for the reduction of carbohydrate metabolism intermediates, one might expect an increase of fatty acid production. In this way methane inhibitors may play a central role in providing a means of controlling rumen fermentation and obtaining selective alterations in the pattern of volatile fatty acid formation.

Compounds and mixtures were tested with the object of obtaining a material which will inhibit methane production without creating potential residue problems by entering the normal energy metabolism of microorganisms in the rumen and thereby possibly also modifying the end products of fermentation to achieve a situation more advantageous to the host animal, e.g. stimulating propionic or butyric acid production.

In preliminary studies a range of derivatives of IBD were tested since this material is cheap and freely available. The following showed encouraging results:

Table 10

| Ref. No. | Formulation | Physical state | Level % | % inhibition of methane |
|---|---|---|---|---|
| AF 20 | Isobutyl bromide | liquid | 0.5 | 30 |
| 21 | Isobutyl acetate | liquid | 2 | 100 |
| 22 | Isobutyl chloride | liquid | 0.5 | 90 |
| 23 | Chlorinated IBDU | solid | 1 | 85 |
| 24 | IBD : Trioxane (2:1)v/v | liquid | 1 | 30 |
| 25 | IBD : Trioxane (3*1)v/v | liquid | 1 | 30 |
| 26 | IBD : Trioxane (4:1)v/v | liquid | 1 | 90 |
| 28 | IBD : Trioxane (6:1)v.v | liquid | 0.5 | 20 |
| 30 | Methylene dioxymethylene di-isobutyrate | liquid | 0.5 | 90 |
| *32 | (IBD + urea) chlorine derivative | solid | 0.5 | 60 |

*Made by heating 1½ gm. moles urea to 55°C, mixing with 1 gm. mole IBD and saturating with chlorine.

These, and other, compounds and mixtures were further examined by the following procedure:

Procedure

Rumen fluid is removed from a sheep via a rumen cannula. The fluid is strained through several layers of muslin to remove larger food particles; if necessary. The strained rumen fluid is then mixed 1:1 (v/v) with artificial saliva and the mixture supplemented with further nutrients: 0.25% (w/v) of each of the following: urea, sucrose, starch, cellulose. A control preparation is prepared without additive, and a test preparation containing additive at an appropriate concentration under test. During the time that the various components are being added the mixture is continually gassed with oxygen free nitrogen to maintain anaerobic conditions. Equilibration is carried out for 15 minutes before adding 40 ml of the mixture to a 100 ml glass gas syringe fitted with a 3-way tap. Air is expelled from the syringe and replaced with 10 ml of nitrogen and the control and test syringes incubated at 37°C in a waterbath for 6 hours. Periodically the total gas evolved in the 100 ml syringe is measured and aliquots are removed via the 3-way tap and a small gas syringe for analysis of the evolved gas composition. The evolution of total gas reflects the effect of an additive on overall fermentation and the $CH_4$ levels indicate the potential effectiveness of an additive as a methane inhibitor.

The results of these tests are shown in Table 11, in which the following code is used:

CODE

| Total gas | | $CH_4$% reduction |
|---|---|---|
| O | identical | |
| + | — 0–25% | —— 50 to 100% |
| ++ | — 26–50% | — 25 to 50% |
| +++ | —— 51–100% | - 0 to 25% |
| ++++ | —— >100% | |
| Stimulation | reduction | (+) stimulation |

Table 11

| Ref. No. | Compound | % concentration | Total gas % v control 2 hours | % reduction in $CH_4$ v control during 2-4 hrs |
|---|---|---|---|---|
| AF 6 | Isobutanol | 1.0 | + | + |
| 7 | Isobutyl isobutyrate | 0.1 | – | – |
| 11 | Isobutyl succinate | 1.0 | – | – |
| 12 | Isobutyl adipate | 1.0 | ++++ | —— |
| 13 | Isobutyl AGSate | 1.0 | ++ | – |
| 14 | Isobutyl glutarate | 1.0 | ++++ | —— |
| 15 | Isobutyl phosphate | 1.0 | ++++ | – |
| 16 | Isobutyl amide | 1.0 | – | – |
| 17 | N propyl isobutyrate | 1.0 | – | – |
| 18 | Isobutyl n propionate | 1.0 | —— | – |
| 19 | Isobutyl iodide | 1.0 | —— | —— |
| | Isobutyl iodide | 0.5 | ——— | —— |
| | Isobutyl iodide | 0.1 | – | + |
| 20 | Isobutyl bromide | 0.1 | – | —— |
| 21 | Isobutyl acetate | 1.0 | +++ | —— |
| | Isobutyl acetate | 0.5 | ++ | —— |
| | Isobutyl acetate | 0.1 | ++ | — |
| 22 | Isobutyl chloride | 1.0 | —— | —— |
| | Isobutyl chloride | 0.5 | – | —— |
| | Isobutyl chloride | 0.1 | – | —— |
| 23 | Chlorinated IBDU | 1.0 | – | —— |
| | Chlorinated IBDU | 0.5 | – | – |
| | Chlorinated IBDU | 0.1 | – | – |
| 24 | IBD + trioxane mixture (2:1) | 1 | – | —— |
| | | 0.5 | + | —— |
| | | 0.1 | +++ | —— |
| 25 | IBD + trioxane mixture (3:1) | 1 | ++ | —— |
| | | 0.5 | ++ | —— |
| | | 0.1 | + | —— |

Table 11-continued

| Ref. No. | Compound | % concentration | Total gas % v control 2 hours | % reduction in CH₄ v control during 2-4 hrs |
|---|---|---|---|---|
| 26 | IBD + Trioxane mixture (4:1) | 1 | — | — |
| | | 0.5 | — | — |
| | | 0.1 | — | — |
| 27 | IBD + Trioxane mixture (5:1) | 1 | 0 | — |
| | | 0.5 | + | — |
| | | 0.1 | + | — |
| 28 | IBD + Trioxane mixture (6:1) | 1 | + | — |
| | | 0.5 | + | — |
| | | 0.1 | + | — |
| 29 | Methylene di-isobutyrate | 1 | — | — |
| | | 0.5 | — | — |
| | | 0.1 | + | — |
| 30 | Methylene dioxymehtylene di-isobutyrate | 1 | — | — |
| | | 0.5 | — | — |
| | | 0.1 | + | — |
| 32 | (IBD + urea)Cl₂ derivs | 1 | — | — |
| | | 0.5 | + | — |
| | | 0.1 | — | — |

Whereas it is always desirable to inhibit the formation of methane, it is not necessarily advantageous to inhibit ruminal fermentation (i.e. to reduce the total amount of gas formed). Stimulation of ruminal activity may decrease the absorption of natural proteins, minerals and trace elements by the host animal, but on the other hand it enhances utilisation of structural carbohydrate, e.g. cellulose, by increasing the production of C2–C4 acids which are precursors of milk fat and protein (for milk production) and body tissue and fat (for beef production). Thus some substances which are methane inhibitors may play an additional role in providing a means of controlling rumen fermentation and obtaining selective variations in the pattern of volatile fatty acid formation. In the foregoing Table 11, we are primarily interested in compounds showing a reduction in methane than in reduction or stimulation of rumen fermentation. We would consider as useful any compound showing a methane reduction of about 25% or more (i.e. depicted with two or three "minus" signs beside it).

Reverting to the foregoing Tables 3 to 11, the individual Tables show:

Table 3. IBD:AGS and IBD:IBA exhibit a preservative effect on compound animal feeds.

Table 4. This preservative effect is exhibited by IBD-:IBA, and IBD:AGS (as above) and also by IBD/acetic acid and IBD/formalin, and to a lesser extent by IBD/H$_2$SO$_4$, isobutanol, isobutyl isobutyrate and isobutanol/sodium isobutyrate.

Tables 5 to 8. Microbial inhibition or reduction, leading to decrease in microbial spoilage, is exhibited by isobutyl isobutyrate, isobutanol, and isobutanol IBA.

Table 9. Self-heating acid mould contamination of wet hay is inhibited by mixtures of IBD:IBA and IBD-:AGS.

Tables 10, 11. Methane formation in ruminants is reduced or inhibited by isobutyl adipate, isobutyl glutarate, isobutyl iodide, isobutyl chloride, isobutyl bromide (i.e. isobutyl halides), isobutyl acetate, chlorinated IBDU, mixtures of IBD with trioxane, methylene di-isobutyrate, methylene dioxymethylene di-isobutyrate, and chlorinated mixtures of IBD and urea.

I claim:

1. Animal feedstuffs selected from the group consisting of compound feeds, feed blocks, liquid feed supplements, drenches, slow release pellets, ensiled green fodder, hay and grain, containing a mixture of isobutyraldehyde with a substance selected from the group consisting of AGS (Adipicglutaric-succinic) acid, acetic acid, formalin, sulphuric acid, and trioxane or a chlorinated mixture of isobutyraldehyde with urea.

2. Animal feedstuffs as claimed in claim 1, comprising a mixture of isobutyraldehyde and AGS acid in the ratio 1:1 v/v.

3. Animal feedstuffs as claimed in claim 1, comprising a compound feed containing a mixture of isobutyraldehyde and acetic acid in the ratio 3:1 v/v.

4. Animal feedstuffs as claimed in claim 1, comprising a compound feed containing a mixture of isobutyraldehyde and formalin in the ratio 3:1 v/v.

5. An animal feedstuff as claimed in claim 1, comprising ensiled green fodder, hay or grain treated with a mixture containing isobutyraldehyde and AGS acid in the ratio 3:1 to 1:3 v/v.

6. An animal feedstuff as claimed in claim 1, containing a mixture of isobutyraldehyde and trioxane in the ratio 2:1 to 6:1 v/v.

7. An animal feedstuff as claimed in claim 1, containing a chlorinated mixture of isobutyraldehyde with urea.

* * * * *